(12) United States Patent
Yamaguchi

(10) Patent No.: US 10,791,230 B2
(45) Date of Patent: Sep. 29, 2020

(54) IMAGE FORMING APPARATUS, INSTRUCTION ACCEPTANCE METHOD, AND COMPUTER READABLE PROGRAM

(71) Applicant: KONICA MINOLTA, INC., Chiyoda-ku, Tokyo (JP)

(72) Inventor: Tomohiro Yamaguchi, Shinshiro (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/506,130

(22) Filed: Jul. 9, 2019

(65) Prior Publication Data

US 2020/0028979 A1 Jan. 23, 2020

(30) Foreign Application Priority Data

Jul. 17, 2018 (JP) .................................. 2018-133951

(51) Int. Cl.
*H04N 1/00* (2006.01)
*G06F 3/12* (2006.01)

(52) U.S. Cl.
CPC ....... *H04N 1/00403* (2013.01); *G06F 3/1238* (2013.01); *G06F 3/1256* (2013.01); *G06F 3/1258* (2013.01); *H04N 1/00392* (2013.01)

(58) Field of Classification Search
None
See application file for complete search history.

(56) References Cited

U.S. PATENT DOCUMENTS

| 8,411,050 B2 | 4/2013 | Zalewski | |
|---|---|---|---|
| 2011/0065428 A1* | 3/2011 | Schroeter | H04M 1/72563 455/418 |
| 2014/0070002 A1* | 3/2014 | Pineau | G06K 5/00 235/382 |
| 2018/0288248 A1* | 10/2018 | Shen | G10L 15/30 |

FOREIGN PATENT DOCUMENTS

| JP | 2004234529 A | 8/2004 |
|---|---|---|
| JP | 2005115773 A | 4/2005 |
| JP | 2007079852 A | 3/2007 |
| JP | 2013041379 A | 2/2013 |
| JP | 2013508808 A | 3/2013 |

* cited by examiner

*Primary Examiner* — Thomas D Lee
(74) *Attorney, Agent, or Firm* — Buchanan Ingersoll & Rooney PC

(57) ABSTRACT

An image forming apparatus to be used together with equipment to be used by a user with both hands, the image forming apparatus includes: an acceptor that does not accept, by voice, an instruction for processing to be performed by the image forming apparatus before the user holds the equipment but accepts, by the voice, the instruction while the equipment is being used with both of the hands.

12 Claims, 13 Drawing Sheets

FIG. 5
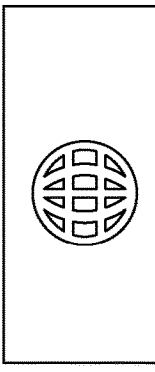
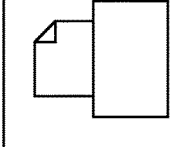
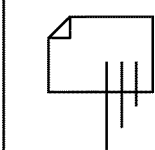
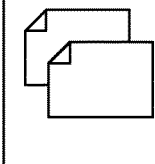
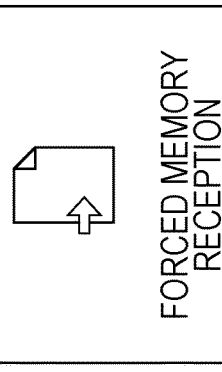
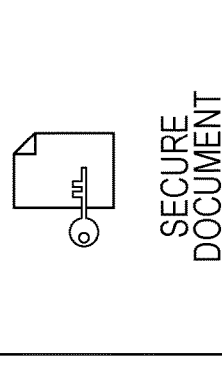
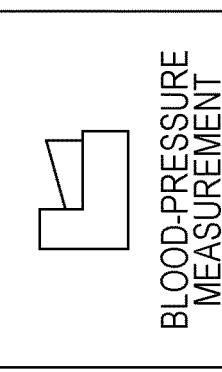
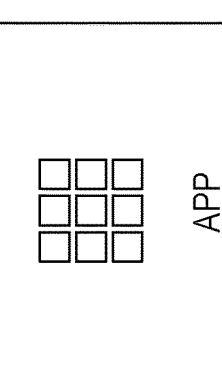

105

| JOB CODE | JOB TYPE | USER CODE |
|---|---|---|
| J001 | COPY | U001 |
| J002 | PC PRINT | U002 |
| J003 | FAX TRANSMISSION | U003 |
| J004 | COPY | U004 |

6C

5C

1. START
2. STOP
3. METHOD OF MEASUREMENT
4. DISPLAY OF JOB LIST
5. NEXT PAGE

END — 7C

107

| MEASUREMENT DATE AND TIME | SUBJECT CODE | MEASUREMENT DATA |
|---|---|---|
| 20180518 13:00 | U001 | |
| 20180521 15:30 | U002 | |
| 20180522 10:00 | U003 | |
| 20180522 13:30 | U004 | |

6D

IMAGE FORMING APPARATUS, INSTRUCTION ACCEPTANCE METHOD, AND COMPUTER READABLE PROGRAM

The entire disclosure of Japanese patent Application No. 2018-133951, filed on Jul. 17, 2018, is incorporated herein by reference in its entirety.

BACKGROUND

Technological Field

The present invention relates to the technology of an image forming apparatus to be used together with equipment, such as a measurement device that measures the living body of a user.

Description of the Related Art

Conventionally, image forming apparatuses referred to as "multi function peripherals (MFPs)", have been widespread.

Typically, such an image forming apparatus is instructed by a touch of a user to an input device, such as a touch panel. Furthermore, such an image forming apparatus is instructed by input of a voice of a user into an input device, such as a microphone. This arrangement enables an instruction by voice in addition to an instruction by touch, resulting in improvement of the convenience of a user. JP 2013-41379 A, JP 2004-234529 A, JP 2013-508808 A, JP 2007-79852 A, and JP 2005-115773 A each disclose a device to which a user can provide an instruction by touch or an instruction by voice.

Mobile electronic equipment described in JP 2013-41379 A includes: a casing; a capacitive touch panel that displays an image and detects a touch operation as an input signal; a microphone that detects a sound as a voice signal; and a controller that processes the voice signal detected by the microphone as the input signal of the touch operation performed to the touch panel, in a voice operation mode. When discriminating that the touch operation is abnormal due to moisture adhering to the touch panel or when discriminating that detected humidity is a predetermined level or more, the mobile electronic equipment migrates to the voice operation mode.

A kiosk terminal described in JP 2004-234529 A includes: a touch panel disposed in superimposition on a display, the touch panel being to sense input by a touch of an operator; and a voice input device that senses a voice of the operator and converts the voice into character data. When the touch panel senses a touch to an input field after display of an input screen, a Japanese syllabary input screen is displayed. The operator touches characters displayed on the Japanese syllabary input screen, to input data. In a case where no input has been made through the touch panel for five seconds after display of the input screen or after input through the touch panel, the kiosk terminal accepts voice input. That is the kiosk terminal switches to voice input.

A calculation device described in JP 2013-508808 A acquires, in response to a touch of a user to a touch input area, the positional coordinates of the touch input area, and further acquires a voice signal from a voice sensor. The impact strength of the touch of the user is determined on the basis of the voice signal. The calculation device performs an action associated with the determined impact strength.

According to JP 2007-79852 A, a data processing device in a voice input mode in which processing is performed on the basis of a voice input through a microphone, migrates, in a case where determining that an input voice has been registered in a voice-input prohibition information list, to an operator input mode to prompt a user to perform an input with a numeric keypad, otherwise prompts the user to perform an input with a voice. Thus, for information requiring retaining as a secret, the data processing device prompts the user to perform an input with the numeric keypad in order to prevent another person from listening to the information, and, for information requiring no retaining as a secret, prompts the user to perform a simplified input through a voice.

An L mode facsimile described in JP 2005-115773 A includes: a voice recognizer; a button operator; an operation time database; a CPU; a RAM; a ROM; a display; and a voice synthesizer. On the basis of a task selection of a user, the CPU reads the average operation time in each input mode (a voice input mode, a button input mode, or the voice input mode and the button input mode) from the operation time database, and displays an input mode selection screen on the display. Selection of a combined operation of voice input and button input by the user on the input mode selection screen, causes the CPU to display a screen prompting the user to perform voice input. Then, the CPU displays a result of utterance of the user recognized in voice by the voice recognizer, onto the screen. Next, the CPU displays a screen prompting the user to perform button input, and displays a result of the button input of the user onto the screen.

However, even when a function of accepting an instruction by voice is provided, only provision of an instruction by touch from a user makes the function unused. There is a possibility that acceptance of a voice of a user who is not using an image forming apparatus, as an instruction, causes the image forming apparatus to perform unnecessary processing.

SUMMARY

An object of the present invention is to provide an image forming apparatus in which a function of accepting an instruction by voice is more efficient than ever before.

To achieve the abovementioned object, according to an aspect of the present invention, there is provided an image forming apparatus to be used together with equipment to be used by a user with both hands, and the image forming apparatus reflecting one aspect of the present invention comprises: an acceptor that does not accept, by voice, an instruction for processing to be performed by the image forming apparatus before the user holds the equipment but accepts, by the voice, the instruction while the equipment is being used with both of the hands.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is an illustration of an exemplary home screen;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
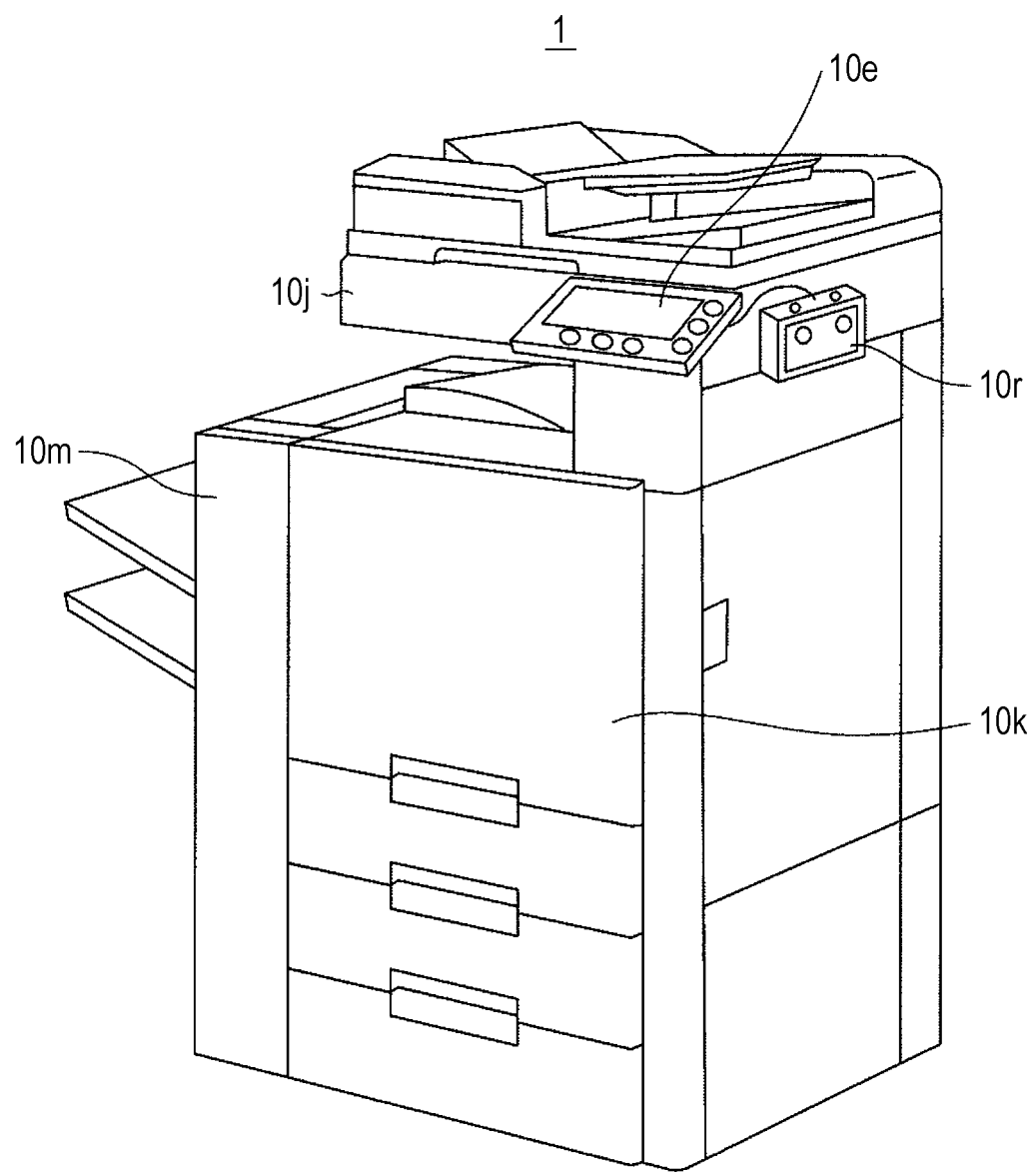
FIG. 1 is an illustration of an exemplary external appearance of an image forming apparatus.
Figure 2:
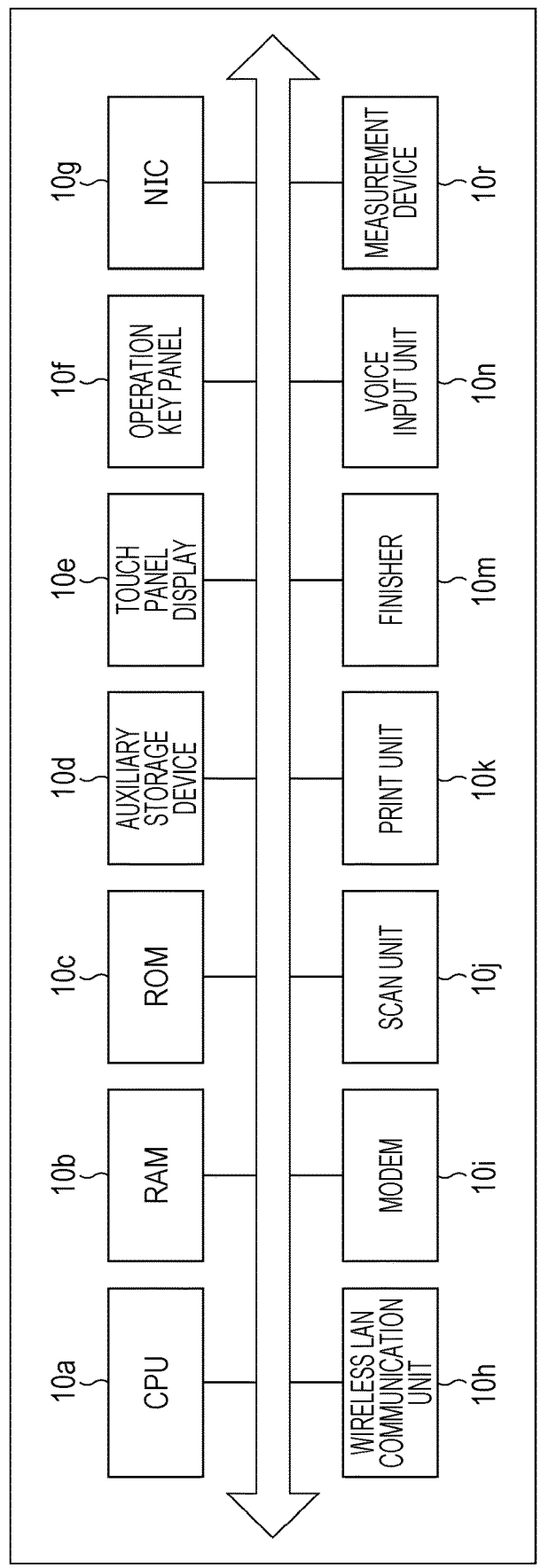
FIG. 2 is an illustration of the hardware configuration of the image forming apparatus.
Figure 3:
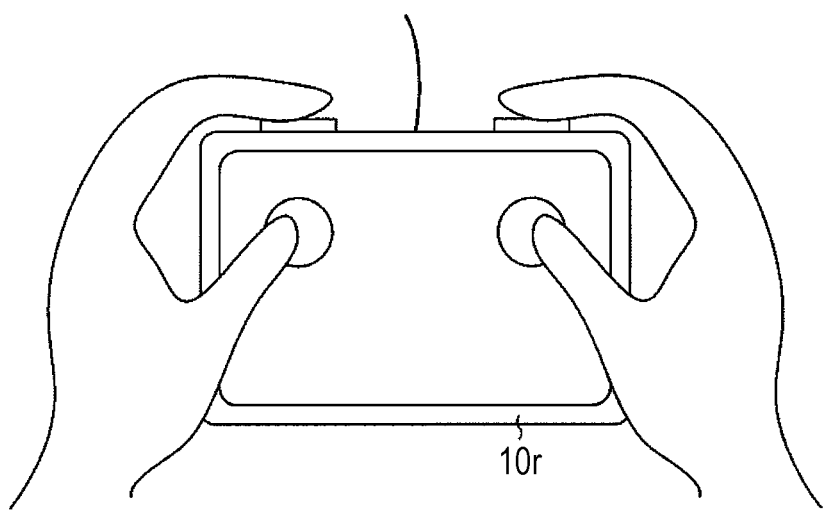
FIG. 3 is an illustration of an exemplary measurement device held with both hands of a user.
Figure 4:
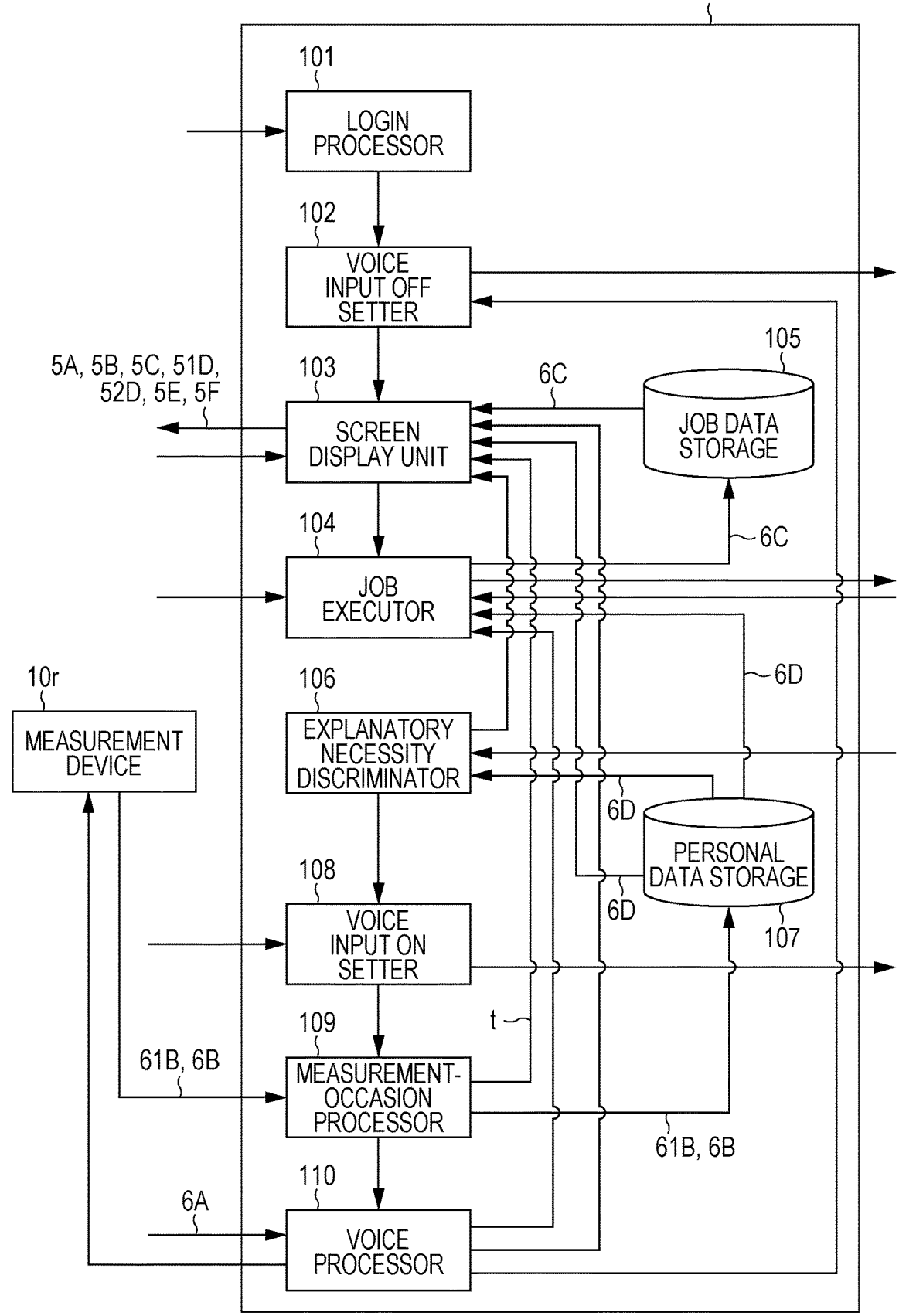
FIG. 4 is an illustration of an exemplary functional configuration of the image forming apparatus.

FIG. 1 is an illustration of an exemplary external appearance of an image forming apparatus 1. FIG. 2 is an illustration of the hardware configuration of the image forming apparatus 1. FIG. 3 is an illustration of an exemplary measurement device 10r held with both hands of a user. FIG. 4 is an illustration of an exemplary functional configuration of the image forming apparatus 1.

The image forming apparatus 1 illustrated in FIG. 1 has a collective function, such as copying, PC printing, cloud printing, faxing, scanning, and boxing. Generally, the image forming apparatus 1 is also referred to as a "multi function peripheral (MFP)".

The PC print function allows printing an image on a sheet on the basis of image data received from a terminal device in the same local area network (LAN) as the image forming apparatus 1. The PC print function is also referred to as "network printing" or "network print".

The cloud print function allows printing an image on a sheet on the basis of image data received from an external terminal device through a server on the Internet.

The box function allows each user given a storage area referred to as a "box" or a "personal box", to save and manage, for example, image data in the storage area. Provision of a box per group enables the members to share in each group. The box corresponds to a "folder" or a "directory" in a personal computer.

As illustrated in FIG. 2, the image forming apparatus 1 includes, for example, a central processing unit (CPU) 10a, a random access memory (RAM) 10b, a read only memory (ROM) 10c, an auxiliary storage device 10d, a touch panel display 10e, an operation key panel 10f, a network interface card (NIC) 10g, a wireless LAN communication unit 10h, a modem 10i, a scan unit 10j, a print unit 10k, a finisher 10m, a voice input unit 10n, and a measurement device 10r.

The CPU 10a is the main CPU of the image forming apparatus 1. The RAM 10b is the main memory of the image forming apparatus 1.

The touch panel display 10e displays, for example, a screen indicating a message to the user, a screen into which the user inputs a command or information, or a screen indicating a result of processing performed by the CPU 10a. Furthermore, the touch panel display 10e transmits a signal indicating the touched position, to the CPU 10a.

The operation key panel 10f that is a so-called hardware keyboard, includes, for example, a numeric keypad, a start key, a stop key, and function keys.

The NIC 10g communicates with a different device in accordance with a protocol, such as transmission control protocol/internet protocol (TCP/IP).

The wireless LAN communication unit 10h communicates with a different device on the basis of the standard of Institute of Electrical and Electronics Engineers (IEEE) 802.11 that is a wireless LAN standard.

The modem 10i exchanges document data with a facsimile in accordance with a protocol, such as G3.

The scan unit 10j reads an image on an original (sheet) set on an auto document feeder (ADF) or a platen glass, and generates image data.

The print unit 10k prints an image in image data received from an external device through the NIC 10g, onto a sheet, in addition to the image read by the scan unit 10j.

The finisher 10m performs, as necessary, postprocessing to printed matter acquired by the print unit 10k. Examples of the postprocessing include processing of stapling, processing of punching, and processing of folding.

The voice input unit 10n including, for example, a sound board and a microphone, collects sound and generates voice data 6A. Particularly, in a case where the user instructs the image forming apparatus 1 by so-called voice input, the voice input unit 10n generates the voice data 6A indicating a voice uttered from the user (namely, a voice of the user).

The measurement device 10r measures, for example, the blood pressure and the pulse of the user. As illustrated in FIG. 3, the user covers four terminals with the thumbs and the forefingers of both hands. In this manner, the measurement device 10r is held with both hands.

For example, the measurement device 10r irradiates the thumbs and the forefingers of both hands with light, and detects the light reflected from the fingers at predetermined time intervals (e.g., every one second). This arrangement allows acquisition of a pulse wave. While the measurement device 10r itself is being held, for example, the blood pressure and the pulse of the user are measured on the basis of the acquired pulse wave. The measurement device 10r generates measurement data 6B indicating a measured result (namely, measured values) and then transmits the measurement data 6B to the image forming apparatus 1.

The measurement device 10r is connected to the image forming apparatus 1 by wire or wireless. The measurement device 10r is disposed detachably, for example, on a side face of the image forming apparatus 1. Note that removal of the measurement device 10r from the side face causes a sensor to detect the removal.

The ROM 10c or the auxiliary storage device 10d stores an application for achieving a function, such as the copying. The ROM 10c or the auxiliary storage device 10d stores a measurement-occasion processing program 10P (refer to FIG. 4).

The measurement-occasion processing program 10P enables the image forming apparatus 1 to accept an instruction by voice input of the user while the measurement device 10r is measuring the blood pressure of the user. The measurement-occasion processing program 10P allows output of the measured result. The detail thereof will be described later.

The measurement-occasion processing program 10P causes a login processor 101, a voice input OFF setter 102, a screen display unit 103, a job executor 104, a job data storage 105, an explanatory necessity discriminator 106, a personal data storage 107, a voice input ON setter 108, a measurement-occasion processor 109, and a voice processor 110 of FIG. 4 to be achieved in the image forming apparatus 1.

Figure 6:
FIG. 6 is an illustration of an exemplary copy operation screen.
Figures 7, 8, 9:
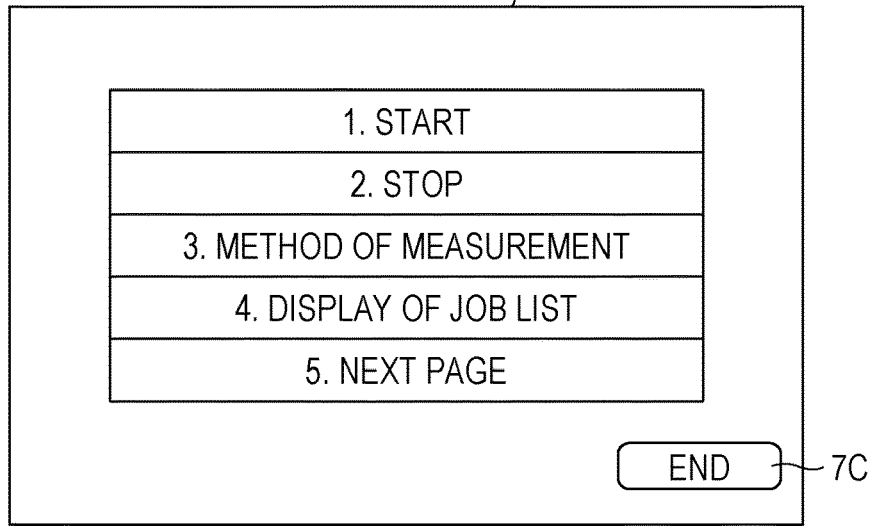
FIG. 7 is an illustration of exemplary job data.
FIG. 8 is an illustration of an exemplary explanatory screen.
FIG. 9 is an illustration of exemplary personal data.
Figure 10:
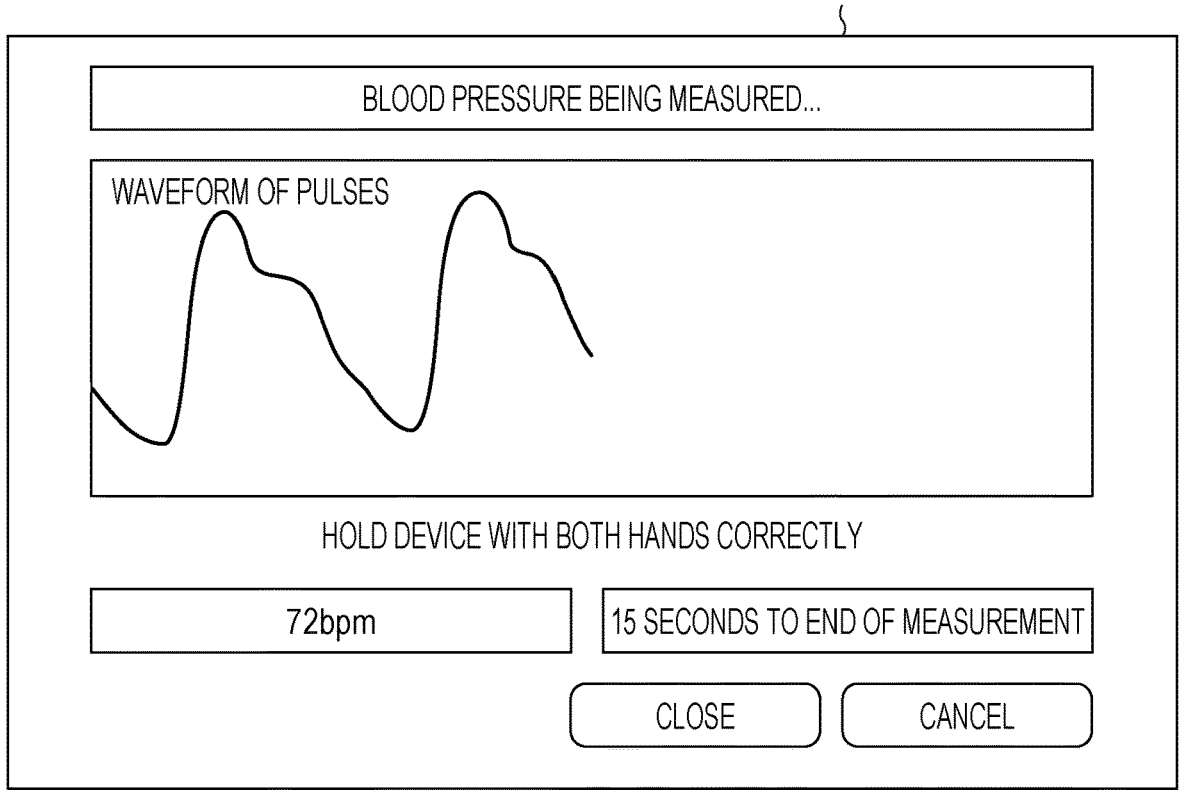
FIG. 10 is an illustration of an exemplary measurement-in-process screen.
Figure 11:
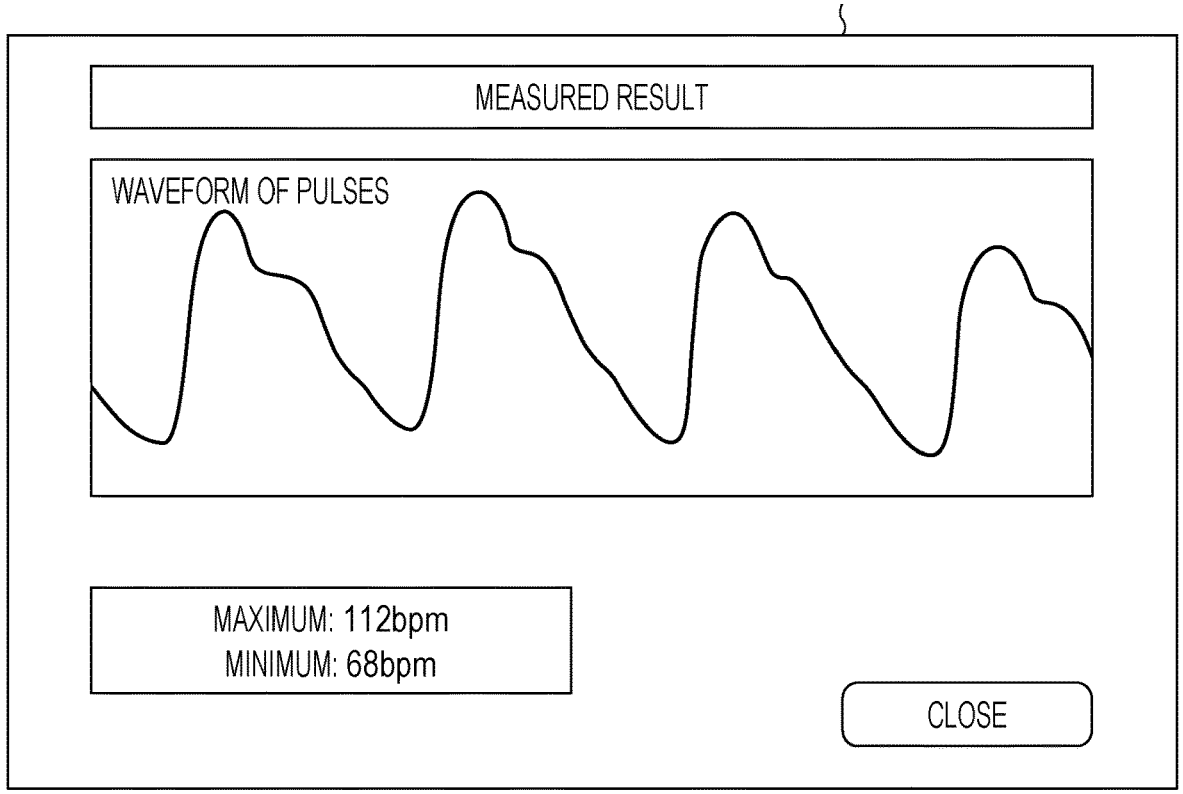
FIG. 11 is an illustration of an exemplary measured-result screen.
Figure 12:
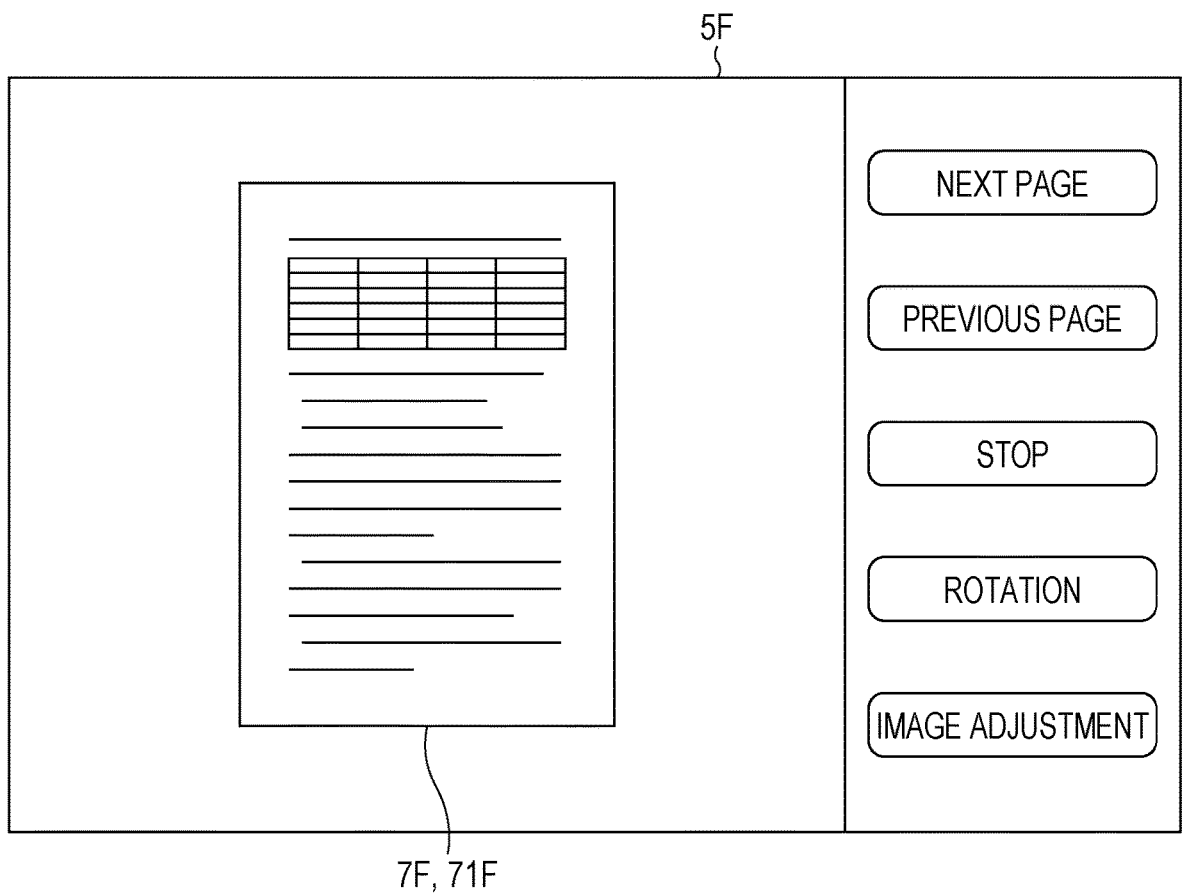
FIG. 12 is an illustration of an exemplary view screen.

FIG. 5 is an illustration of an exemplary home screen 5A. FIG. 6 is an illustration of an exemplary copy operation screen 51B. FIG. 7 is an illustration of exemplary job data 6C. FIG. 8 is an illustration of an exemplary explanatory screen 5C. FIG. 9 is an illustration of exemplary personal data 6D. FIG. 10 is an illustration of an exemplary measurement-in-process screen 51D. FIG. 11 is an illustration of an exemplary measured-result screen 52D. FIG. 12 is an illustration of an exemplary view screen 5F.

The operation of the login processor 101, the voice input OFF setter 102, the screen display unit 103, the job executor 104, the job data storage 105, the explanatory necessity discriminator 106, the personal data storage 107, the voice input ON setter 108, the measurement-occasion processor 109, and the voice processor 110 of FIG. 4, will be described below with reference to FIGS. 5 to 12 with an exemplary case where the image forming apparatus 1 performs a job of copying and receives the measurement data 6B from the measurement device 10r.

The user considers causing the image forming apparatus 1 to copy the image of an original. Then, the user with the user name and the password thereof makes a request to the image forming apparatus 1 for login. Then, the following processing is performed.

In response to acceptance of the request for login, the login processor 101 of the image forming apparatus 1 discriminates whether the user is an authorized user, and permits the user to log in the image forming apparatus 1 in a case where the user is an authorized user.

After permission for login, the voice input OFF setter 102 makes, when the function of the voice input unit 10n is active (namely, on), the function inactive (namely, off) in order to prevent voice input from being performed.

Every occurrence of an event, the screen display unit 103 appropriately causes the touch panel display 10e to display a screen corresponding to the event, as to be described sequentially later.

After permission for login, the screen display unit 103 causes the touch panel display 10e to display the home screen 5A as in FIG. 5. The home screen 5A allows the user to select an operation screen 5B to be displayed on the touch panel display 10e, from a plurality of operation screens 5B, the operation screen 5B being to be operated by the user in order to cause the image forming apparatus 1 to perform the job. A plurality of icons each having a job name is disposed on the home screen 5A.

The user presses an icon 7A corresponding to a screen to be operated for performance of the job of copying, from the plurality of icons, to provide the image forming apparatus 1 with an instruction for display of the copy operation screen 51B as in FIG. 6 onto the touch panel display 10e.

Then, the screen display unit 103 causes the touch panel display 10e to display the copy operation screen 51B.

After providing the instruction for display of the copy operation screen 51B onto the touch panel display 10e, the user sets the original to the ADF. Input of conditions for the job of copying (e.g., the number of print copies and scaling) sets the job, and then an instruction for start of the job is provided. Then, the job executor 104 performs the following processing.

The job executor 104 controls each constituent of the image forming apparatus 1 such that the job is performed. Here, because of the job of copying, the job executor 104 causes, for example, the scan unit 10j and the print unit 10k to perform the job.

Furthermore, the job executor 104 generates the job data 6C indicating the job code identifying the job, the job type indicating the type of the job, and the user code of the user who has provided the instruction, and stores the job data 6C into the job data storage 105 every job code as in FIG. 7.

Note that the image of the original read by the scan unit 10j is stored in, for example, the RAM 10b.

After causing the image forming apparatus 1 to start the job of copying, the user is on standby in front of the image forming apparatus 1 during performance of the job. Here, the user considers measuring the blood pressure of the user itself during the standby time. Then, the user detaches the measurement device 10r from the side face of the image forming apparatus 1. Then, the following processing is performed.

When the sensor detects that the measurement device 10r has been detached from the side face of the image forming apparatus 1, the explanatory necessity discriminator 106 discriminates whether the explanatory screen 5C as in FIG. 8 is to be displayed on the touch panel display 10e, on the basis of the personal data 6D stored in the personal data storage 107, as below. The explanatory screen 5C provides the user with the description of the method of operating the image forming apparatus 1 by voice. Note that the explanatory screen 5C may provide the description of the measurement method with the measurement device 10r.

The personal data storage 107 stores the personal data 6D including the measurement date and time indicating the date and time of measurement of the blood pressure of the user in the past with the image forming apparatus 1, the subject code of the user (namely, a subject), and the measurement data 6B of the user, every measurement date and time, as in FIG. 9.

Note that processing of generating the personal data 6D and storing the personal data 6D into the personal data storage 107, will be described later.

The explanatory necessity discriminator 106 searches the personal data storage 107 for the personal data 6D having the subject code identical to the user code of the user who is currently logging in the image forming apparatus 1. In a case where the personal data 6D has not been found or in a case where the personal data 6D less in pieces of data than a predetermined number has been found, the explanatory necessity discriminator 106 discriminates that the explanatory screen 5C is to be displayed. In a case where the personal data 6D not less in pieces of data than the predetermined number has been found, the explanatory necessity discriminator 106 discriminates that the explanatory screen 5C is not to be displayed. The predetermined number can be arbitrarily set by an administrator.

That is, in a case where the image forming apparatus 1 cannot find the personal data 6D for the user who intends to measure blood pressure from now, not less in pieces of data than the predetermined number, the image forming apparatus 1 discriminates that the user is an inexperienced person in operating the image forming apparatus 1 while measuring blood pressure, namely, a beginner. Then, the image forming apparatus 1 indicates the method of operating the image forming apparatus 1 itself with the measurement device 10r held with both hands (namely, by voice), to the user.

For example, in a case where the predetermined number is three or more, the user code of the user who is currently logging in the image forming apparatus 1 is "U004", and the personal data storage 107 stores the personal data 6D as in FIG. 9, the explanatory necessity discriminator 106 discriminates that the explanatory screen 5C is to be displayed.

When the explanatory necessity discriminator 106 discriminates that the explanatory screen 5C is to be displayed, the screen display unit 103 causes the touch panel display 10e to display the explanatory screen 5C.

After appropriately verifying the method of operating the image forming apparatus 1 through the explanatory screen 5C, the user presses an "end" icon 7C on the explanatory screen 5C. Then, the following processing is performed.

When the user presses the "end" icon 7C on the explanatory screen 5C, the voice input ON setter 108 (refer to FIG. 4) turns on the function of the voice input unit 10n. That is the voice input ON setter 108 makes the function active such that voice input is allowed. Similarly, when the explanatory necessity discriminator 106 discriminates that the explanatory screen 5C is not to be displayed, the voice input ON setter 108 turns on the function of the voice input unit 10n.

When the user presses the "end" icon 7C on the explanatory screen 5C, the measurement device 10r starts processing of measurement. Similarly, when the explanatory necessity discriminator 106 discriminates that the explanatory screen 5C is not to be displayed, the measurement device 10r starts the processing of measurement.

Here, for example, the measurement device 10r cannot acquire the pulse wave of the user unless the user holds the measurement device 10r correctly. As a result, the processing of measurement is not allowed to start. In this case, the screen display unit 103 may cause the touch panel display 10e to continuously display a screen displaying an error, until the measurement device 10r is allowed to start the processing of measurement.

The measurement device 10r generates the measurement data 6B every measurement, and transmits the measurement data 6B to the image forming apparatus 1, successively.

After reception of the first measurement data 6B (hereinafter, referred to as "measurement data 61B") in the processing of measurement for this time (hereinafter, referred to as "measurement processing for this time"), the measurement-occasion processor 109 performs the following processing.

After reception of the measurement data 61B, the measurement-occasion processor 109 causes the personal data storage 107 to store, as the personal data 6D, the measurement data 61B in association with the data and time of the reception of the measurement data 61B as the measurement date and time and the user code of the user who is currently logging in the image forming apparatus 1 as the subject code (refer to FIG. 9). In addition, the measurement-occasion processor 109 starts measurement of elapse in time.

After reception of the measurement data 61B, the measurement-occasion processor 109 causes the personal data storage 107 to store, every reception of the measurement data 6B in the measurement processing for this time, the measurement data 6B. In this case, the storing is performed such that the data already stored in the personal data storage 107 is not overwritten.

Note that, in a case where the elapsed time is more than the required time from the start to the completion of the processing of measurement, previously stored, for example, in the auxiliary storage device 10d, the measurement-occasion processor 109 discriminates that the measurement processing for this time has been completed.

After the measurement device 10r starts the processing of measurement, the screen display unit 103 performs processing of generating the measurement-in-process screen 51D indicating the content of measurement still in progress as in FIG. 10, as below.

That is the screen display unit 103 reads the personal data 6D of the measurement processing for this time, from the pieces of personal data 6D stored in the personal data storage 107.

The screen display unit 103 requests the remaining time t until completion of the measurement processing for this time, from the measurement-occasion processor 109. In response to the request, the measurement-occasion processor 109 calculates the difference between the required time and the elapsed time as the remaining time t, and transmits the remaining time t to the screen display unit 103.

The screen display unit 103 generates the measurement-in-process screen 51D, on the basis of the measurement data 6B of the read personal data 6D and the received remaining time t.

Note that the screen display unit 103 may reread the personal data 6D and request and receive the new remaining time t at predetermined time intervals (e.g., every two or three seconds) to generate the new measurement-in-process screen 51D to be displayed on the touch panel display 10e. This arrangement causes the measurement-in-process screen 51D to be updated at the predetermined time intervals.

The screen display unit 103 causes the touch panel display 10e to display the generated measurement-in-process screen 51D.

When the measurement-occasion processor 109 discriminates that the measurement processing for this time has been completed, the screen display unit 103 generates the measured-result screen 52D indicating a measured result as in FIG. 11, on the basis of all the measurement data 6B of the personal data 6D of the measurement processing for this time, and causes the touch panel display 10e to display the measured-result screen 52D.

After verifying the measured result through the measured-result screen 52D, the user provides, by voice, the image forming apparatus 1 with an instruction for display of the home screen 5A onto the touch panel display 10e. Alternatively, before completion of the measurement processing for this time, the user provides, by voice, the image forming apparatus 1 with an instruction for interruption of the measurement processing for this time (namely, cancellation). Then, the following processing is performed.

Every input of a voice from the user, the voice input unit 10n (refer to FIG. 2) generates the voice data 6A, on the basis of the voice of the user.

The voice processor 110 (refer to FIG. 4) acquires the voice data 6A generated by the voice input unit 10n, and converts the voice data 6A into a character code, for example, with an input method editor (IME) for sound. The voice processor 110 identifies the content of the instruction from the user, on the basis of the character code. That is, the occurred event is identified.

Provision of the instruction for display of the home screen 5A while the measured-result screen 52D is being displayed on the touch panel display 10e or provision of the instruction for interruption of the measurement processing for this time, causes the voice input OFF setter 102 to turn off the function of the voice input unit 10n. The screen display unit 103 causes the touch panel display 10e to display the home screen 5A (refer to FIG. 5). Note that the image of the original stored in the RAM 10b is deleted.

The provision of the instruction for interruption of the measurement processing for this time, causes the measurement device 10r to interrupt the processing of measurement.

Note that, while the measurement-in-process screen 51D is being displayed, the user can provide, by voice, an instruction for redisplay of the operation screen 5B displayed on the touch panel display 10e before removal of the measurement device 10r from the side face of the image forming apparatus 1. Due to provision of the instruction, the screen display unit 103 causes the touch panel display 10e to display the operation screen 5B.

After that, the user provides, by voice, the image forming apparatus 1 with an instruction for redisplay of the measurement-in-process screen 51D onto the touch panel display 10e. Then, similarly to the above, the screen display unit 103 reads the personal data 6D and requests and receives the new remaining time t, generates the measurement-in-process screen 51D, on the basis of the read personal data 6D and the received remaining time t, and then causes the touch panel display 10e to display the measurement-in-process screen 51D.

Here, when the function of the voice input unit 10n is on, the user provides, by voice, the image forming apparatus 1 with an instruction for interruption (namely, cancellation) or suspension of the job currently being performed by the image forming apparatus 1. Then, the job executor 104 controls each constituent of the image forming apparatus 1 such that the job is suspended, for example.

In this case, the job executor 104 discriminates whether the user who has provided the instruction for performance of the job, is identical to the user who has provided the instruction for interruption or suspension of the job. Specifically, the job executor 104 makes discrimination, on the basis of the user code for the job currently being performed and the subject code of the personal data 6D of the measurement processing for this time. Then, in a case where both of the users are identical, each constituent of the image forming apparatus 1 is controlled so as to suspend the job.

Alternatively, when the function of the voice input unit 10n is on, the user provides, by voice, an instruction for redisplay of the explanatory screen 5C onto the touch panel display 10e, so that the screen display unit 103 causes the touch panel display 10e to display the explanatory screen 5C.

Alternatively, when the function of the voice input unit 10n is on, the user provides, by voice, an instruction for display of a list of jobs performed or being performed by the image forming apparatus 1. Then, on the basis of the job data 6C stored in the job data storage 105, the screen display unit 103 causes the touch panel display 10e to display a job list screen 5E indicating a list of jobs performed or being performed by the image forming apparatus 1.

Alternatively, when the function of the voice input unit 10n is on, the user provides, by voice, the image forming apparatus 1 with an instruction for verification of an image in the job of printing currently being performed by the image forming apparatus 1 (hereinafter, referred to as a "print image 7F"). Then, the screen display unit 103 causes the touch panel display 10e to display the view screen 5F as in FIG. 12 for verification of the print image 7F.

In a case where a plurality of originals is included in the job of printing, while the view screen 5F is being displayed on the touch panel display 10e, the user provides, by voice, the image forming apparatus 1 with an instruction for change of a print image 71F that is the print image 7F currently being displayed on the view screen 5F, to the image of the next original of the original of the print image 71F (namely, the next print image 7F). Alternatively, the user provides an instruction for change to the image of the previous original of the original of the print image 71F (namely, the previous print image 7F). Then, the screen display unit 103 causes the touch panel display 10e to display the view screen 5F including the print image 7F changed in accordance with the instruction of the user.

While the view screen 5F is being displayed on the touch panel display 10e, the user considers changing the direction of printing of the print image 7F because the direction of typing is not identical to the orientation of a sheet. Then, the user provides, by voice, the image forming apparatus 1 with an instruction for suspension of the job of printing currently being performed by the image forming apparatus 1.

Similarly to the above, the job executor 104 controls each constituent of the image forming apparatus 1 such that the job of printing is suspended.

Subsequently, the user provides, by voice, the image forming apparatus 1 with an instruction for rotation of the print image 7F by a predetermined angle in a predetermined direction (e.g., by 90° clockwise). That is the user provides, by voice, the image forming apparatus 1 with an instruction for change of the direction of printing of the print image 7F. Then, the screen display unit 103 causes the touch panel display 10e to display the view screen 5F including the print image 7F rotated in accordance with the instruction of the user.

Subsequently, the user provides, by voice, the image forming apparatus 1 with an instruction for determination of the degree of rotation of the print image 7F (namely, the degree of change of the direction of printing). Then, the job executor 104 controls each constituent of the image forming apparatus 1 such that the job of printing is performed to the rotated print image 7F from the beginning.

While the view screen 5F is being displayed on the touch panel display 10e, the user provides an instruction for adjustment of the print image 7F, for example, in density. Then, the screen display unit 103 causes the touch panel display 10e to display the view screen 5F including the print image 7F adjusted in density in accordance with the instruction of the user.

Alternatively, when the function of the voice input unit 10n is on, the user provides an instruction for performance of a job of reprinting an image in the job of printing recently performed by the image forming apparatus 1 (hereinafter, referred to as a "reprint job"). Then, the job executor 104 searches the RAM 10b for the image that is the target of the reprint job, and causes the reprint job to be performed to a found image.

Note that, unless the image forming apparatus 1 has started the job when the function of the voice input unit 10n is on, the user can provide, by voice, an instruction for start of the job.

In this case, the job executor 104 discriminates whether preparation for performance of the job has been completed, on the basis of, for example, whether the original has been set to the ADF. Then, in a case where the preparation has been completed, the job executor 104 controls each constituent of the image forming apparatus 1 such that the job is performed.

Figure 13:
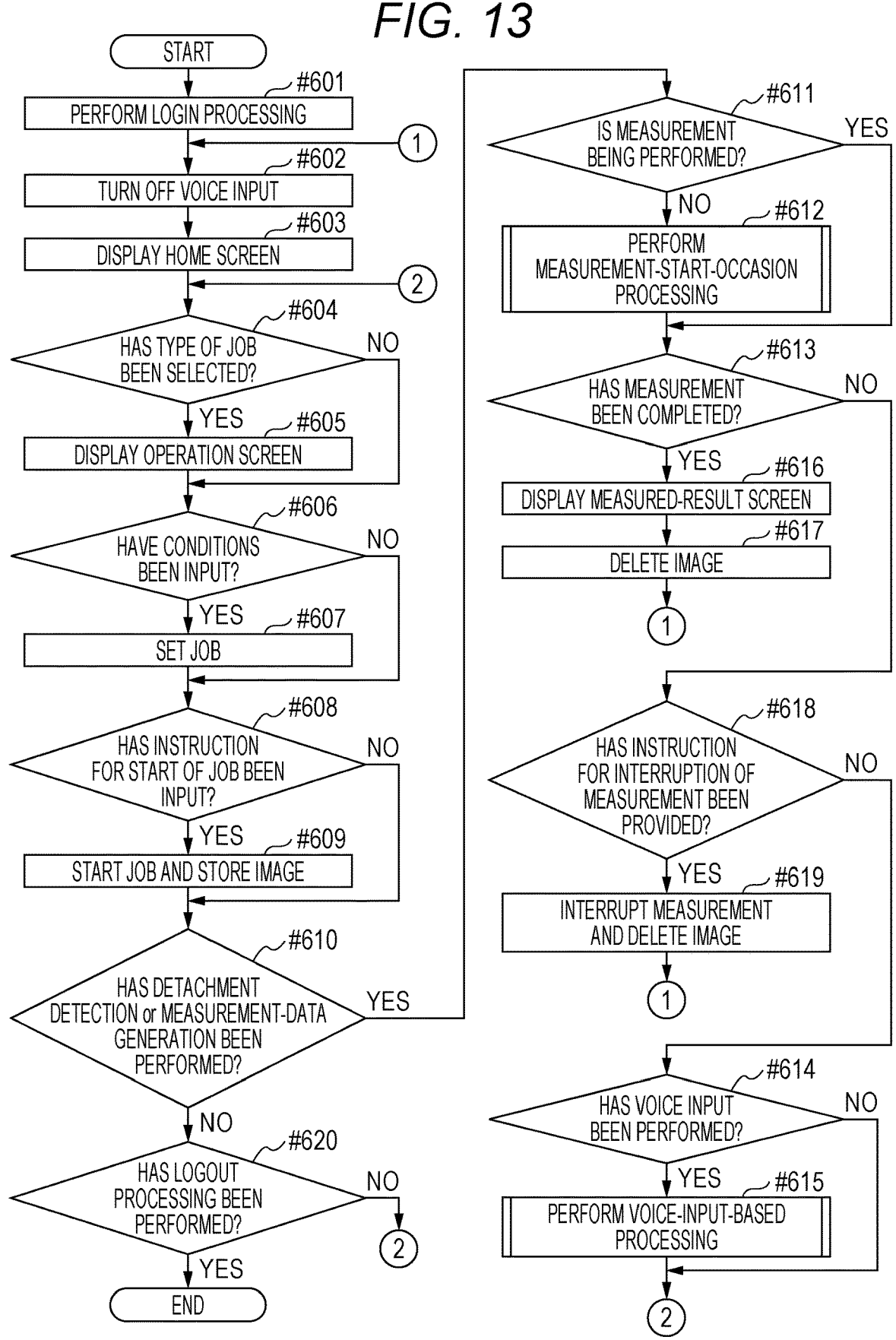
FIG. 13 is a flowchart of an exemplary flow of entire processing of the image forming apparatus.
Figure 14:
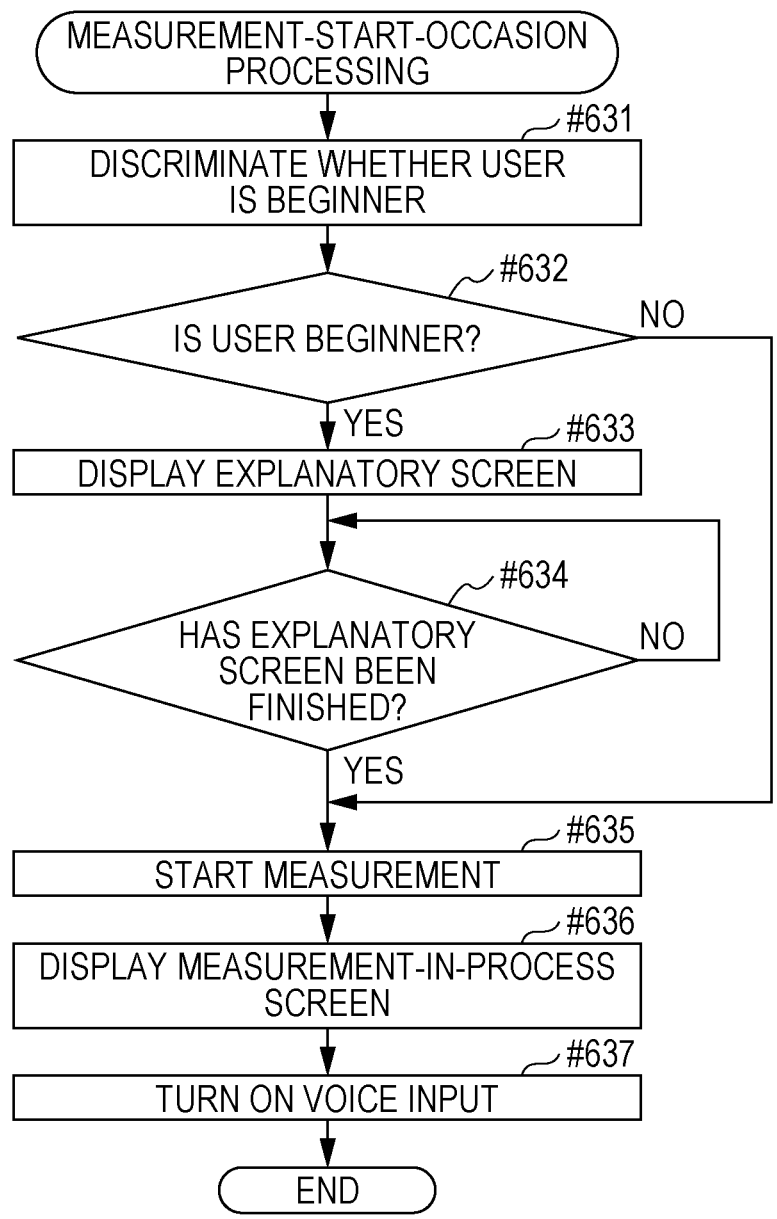
FIG. 14 is a flowchart of an exemplary flow of measurement-start-occasion processing.
Figure 15:
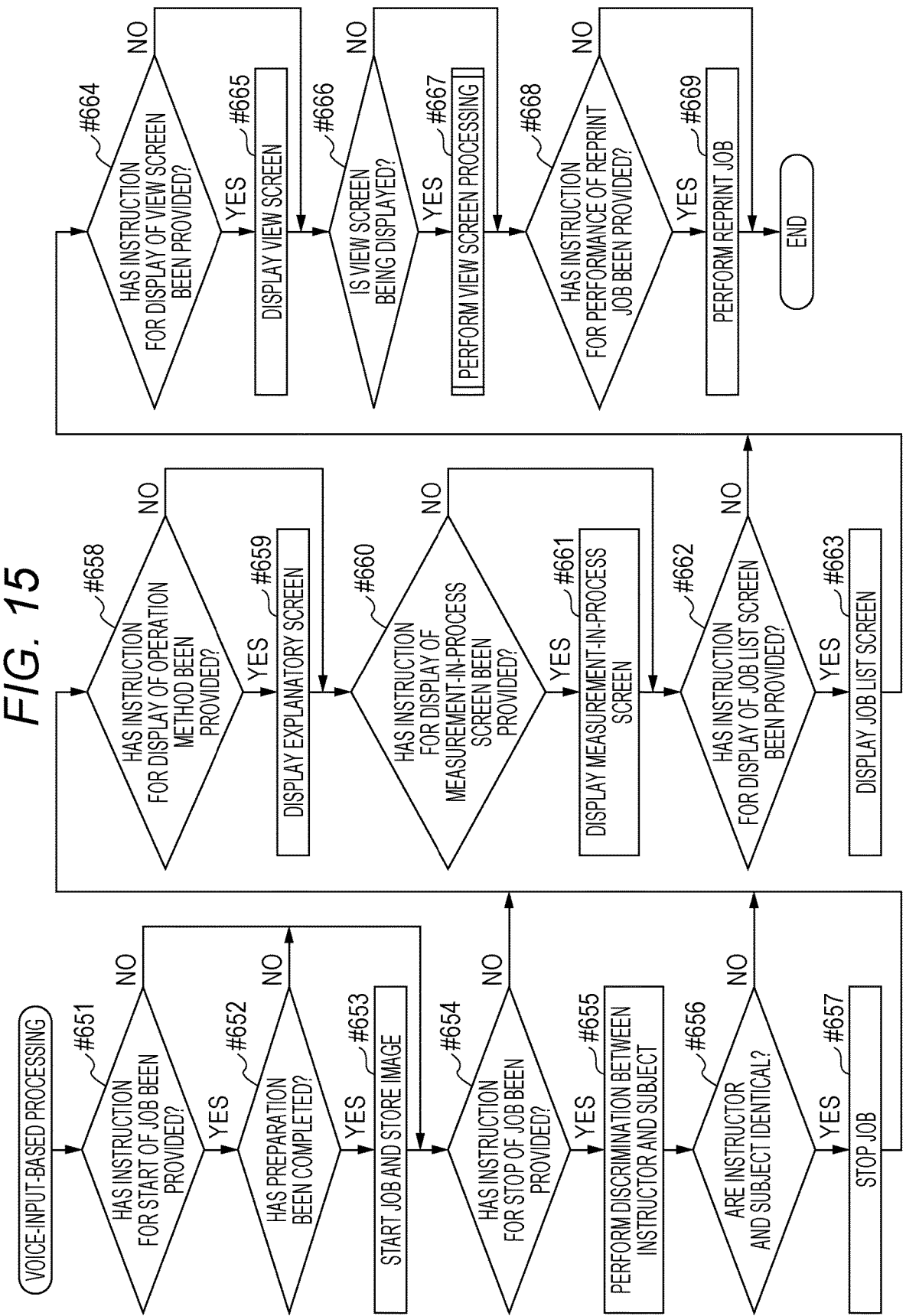
FIG. 15 is a flowchart of an exemplary flow of voice-input-based processing.
Figure 16:
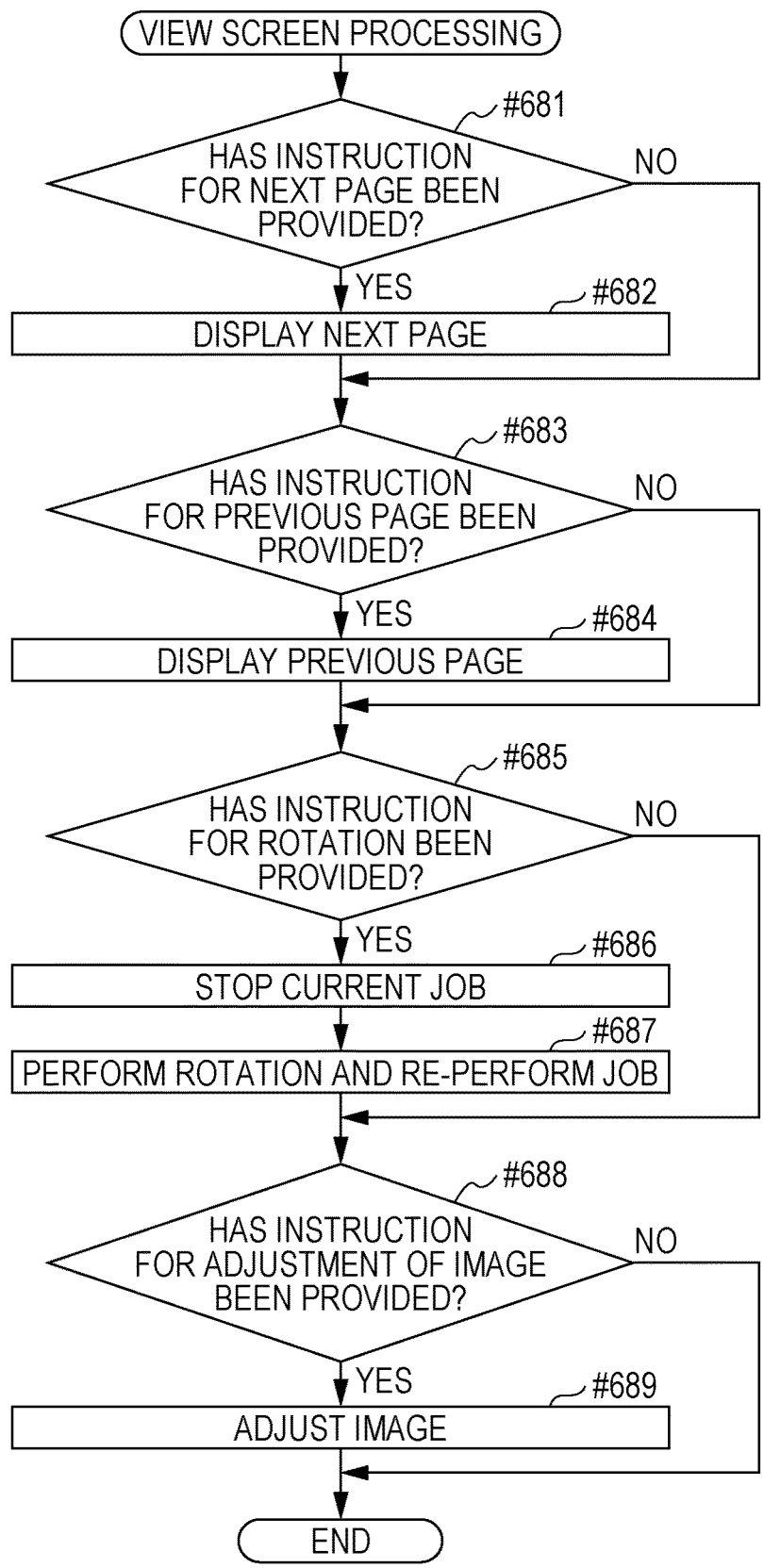
FIG. 16 is a flowchart of an exemplary flow of view screen processing.

FIG. 13 is a flowchart of an exemplary flow of entire processing of the image forming apparatus 1. FIG. 14 is a flowchart of an exemplary flow of measurement-start-occasion processing. FIG. 15 is a flowchart of an exemplary flow of voice-input-based processing. FIG. 16 is a flowchart of an exemplary flow of view screen processing.

Next, the flow of entire processing in the image forming apparatus 1 will be described with reference to the flowcharts of FIGS. 13 to 16.

The image forming apparatus 1 performs the processing in the order illustrated in FIG. 13, on the basis of the measurement-occasion processing program 10P.

The image forming apparatus 1 performs login processing in response to a request for login from the user (#601 of FIG. 13), switches off the function of voice input, if the function of voice input is on, after permission for login (#602), and displays the home screen 5A (#603).

In a case where the user has selected the operation screen 5B that the user desires to display (Yes at #604), the image forming apparatus 1 displays the selected operation screen 5B (#605).

In a case where the user has input conditions for the job (Yes at #606), the image forming apparatus 1 sets the job in accordance with the conditions (#607).

In a case where the user has provided an instruction for start of the job (Yes at #608), the image forming apparatus 1 starts the job (#609). In this case, an image acquired while the job is being performed (e.g., the image of the original read by the scan unit 10j), is stored in the RAM 10b.

In a case where detecting that the measurement device 10r has been detached (Yes at #610 and No at #611), the image forming apparatus 1 performs the measurement-start-occasion processing as in FIG. 14 (#612).

In the measurement-start-occasion processing, the image forming apparatus 1 discriminates whether the user who intends to measure blood pressure is a beginner (#631).

In a case where discriminating that the user is a beginner (Yes at #632), the image forming apparatus 1 displays the explanatory screen 5C (#633). In a case where discriminating that the user is not a beginner (No at #632) or in a case where the explanatory screen 5C is closed (Yes at #634), the image forming apparatus 1 starts the measurement processing (#635), displays the measurement-in-process screen 51D (#636), and turns on the function of voice input (#637).

While the measurement device 10r is continuously generating the measurement data 6B, namely, while the measurement device 10r is performing the measurement processing for this time (Yes at #610, Yes at #611, No at #613, and No at #618), when the user performs voice input (Yes at #614), the image forming apparatus 1 performs the voice-input-based processing as in FIG. 15 (#615).

In the voice-input-based processing, in a case where the voice input includes an instruction for start of the job (Yes at #651) and in a case where preparation for performance of the job has been completed (Yes at #652), the image forming apparatus 1 starts the job and stores an image in the job into, for example, the RAM 10b (#653).

In a case where the voice input includes an instruction for interruption or suspension of the job (Yes at #654), the image forming apparatus 1 discriminates whether the user who has provided the instruction for performance of the job and the subject are identical (#655). In a case where the user and the subject are identical (Yes at #656), the image forming apparatus 1 suspends the job (#657).

In a case where the voice input includes an instruction for display of the explanatory screen 5C (Yes at #658), the image forming apparatus 1 displays the explanatory screen 5C (#659).

In a case where the voice input includes an instruction for display of the measurement-in-process screen 51D (Yes at #660), the image forming apparatus 1 displays the measurement-in-process screen 51D (#661).

In a case where the voice input includes an instruction for display of the job list screen 5E (Yes at #662), the image forming apparatus 1 displays the job list screen 5E (#663).

In a case where the voice input includes an instruction for display of the view screen 5F (Yes at #664), the image forming apparatus 1 displays the view screen 5F (#665). While the view screen 5F is being displayed (Yes at #666), the image forming apparatus 1 performs the view screen processing as in FIG. 16 (#667).

In the view screen processing, in a case where the user has provided, by voice, an instruction for change of the print image 7F on the view screen 5F (namely, the print image 71F) to the next print image 7F (Yes at #681), the image forming apparatus 1 displays the view screen 5F including the next print image 7F (#682).

In a case where the user has provided, by voice, an instruction for change of the print image 7F on the view screen 5F (namely, the print image 71F) to the previous print image 7F (Yes at #683), the image forming apparatus 1 displays the view screen 5F including the previous print image 7F (#684).

In a case where the user has provided, by voice, an instruction for suspension of the job of printing of the print image 7F and rotation of the print image 7F (Yes at #685), the image forming apparatus 1 suspends the job of printing (#686), and then displays the view screen 5F including the print image 7F rotated by a specified angle and performs the job of printing from the beginning (#687).

In a case where the user has provided, by voice, an instruction for adjustment of the print image 7F (Yes at #688), the image forming apparatus 1 displays the view screen 5F including the print image 7F adjusted in accordance with the instruction (#689).

Referring back to FIG. 15, in a case where the user has provided, by voice, an instruction for performance of the reprint job (Yes at #668), the image forming apparatus 1 performs the reprint job (#669).

Referring back to FIG. 13, in a case where the measurement processing for this time has been completed (Yes at #613), the image forming apparatus 1 displays the measured-result screen 52D (#616), and deletes the image in the job stored in the RAM 10b (#617). Then, the image forming apparatus 1 turns off the function of voice input (#602).

In a case where the user has provided an instruction for interruption of the measurement processing for this time (Yes at #618), the image forming apparatus 1 interrupts the measurement processing for this time and deletes the image in the job stored in the RAM 10b (#619). Note that, in this case, the effect that the measurement processing for this time has been interrupted, may be displayed on the touch panel display 10e. Then, the image forming apparatus 1 turns off the function of voice input (#602).

Until the image forming apparatus 1 performs logout processing in response to a request for logout from the user (Yes at #620), the image forming apparatus 1 appropriately repeats steps #602 to #619, #631 to #637, #651 to #669, and #681 to #689 described above.

According to the present embodiment, the image forming apparatus 1 can be provided in which the function of accepting an instruction by voice is more efficient than ever before.

According to the present embodiment, the timing the voice input ON setter 108 turns on the function of the voice input unit 10n, is when the user presses the "end" icon 7C on the explanatory screen 5C. However, the timing may be any of the following timings.

That is the timing may be when the measurement device 10r acquires the pulse wave of the user (namely, when the processing of measurement starts). Alternatively, the timing may be when the explanatory necessity discriminator 106 discriminates whether the explanatory screen 5C is to be displayed on the touch panel display 10e. Alternatively, the timing may be when the sensor detects that the measurement device 10r has been detached from the side face of the image forming apparatus 1.

According to the present embodiment, the timing the voice input OFF setter 102 turns off the function of the voice input unit 10n is when an instruction is provided for display of the home screen 5A while the measured-result screen 52D is being displayed on the touch panel display 10e or when an instruction is provided for interruption of the measurement processing for this time, after permission for login of the login processor 101. However, the timing may be any of the following timings.

That is the timing may be when the measurement device 10r finishes transmitting all the measurement data 6B (namely, when completing the processing of measurement). Alternatively, the timing may be when the sensor detects that the measurement device 10r has returned to the original position (namely, to the side face of the image forming apparatus 1). Alternatively, the timing may be when the measurement device 10r is disabled from acquiring the pulse wave of the user while the processing of measurement is being performed.

According to the present embodiment, the condition that the explanatory necessity discriminator 106 discriminates that the explanatory screen 5C is to be displayed, meets that the personal data 6D of the subject code identical to the user code of the user who is currently logging in the image forming apparatus 1 (hereinafter, referred to as "identical data"), not less in pieces of data than the predetermined number, is stored in the personal data storage 107.

However, the condition (namely, the condition of discriminating that the explanatory screen 5C is to be displayed) may meet that the interval is a predetermined time or more (e.g., 500 hours or more) between the measurement date and time of the identical data recently stored in the personal data storage 107 and the time of start of the processing of measurement by the user who is currently logging in (e.g., the time of detachment of the measurement device 10r from the image forming apparatus 1) (hereinafter, referred to as a "measurement interval time").

Furthermore, the explanatory necessity discriminator 106 may discriminate that the explanatory screen 5C is to be displayed, as long as the measurement interval time is the predetermined time or more even when the identical data not less in pieces of data than the predetermined number, is stored in the personal data storage 107.

According to the present embodiment, the condition that the measurement device 10r starts the processing of measurement, meets that the user presses the "end" icon 7C on the explanatory screen 5C or that the explanatory necessity discriminator 106 discriminates that the explanatory screen 5C is not to be displayed.

However, the condition (namely, the condition of starting the processing of measurement) may meet that the user provides, by voice, the image forming apparatus 1 with an instruction for start of the processing of measurement after the user presses the "end" icon 7C on the explanatory screen 5C or after the explanatory necessity discriminator 106 discriminates that the explanatory screen 5C is not to be displayed.

According to the present embodiment, the measurement-occasion processor 109 calculates the remaining time t. However, the measurement device 10r may calculate the remaining time t. According to the embodiment, the condition that the measurement-occasion processor 109 discriminates that the processing of measurement has been completed, meets that the elapsed time measured by the measurement-occasion processor 109 is more than the required time. However, the condition may meet that the measurement device 10r notifies the measurement-occasion processor 109 that the processing of measurement has been completed and then the measurement-occasion processor 109 receives the notification.

For each case, the measurement device 10r stores the required time. The measurement device 10r starts the processing of measurement simultaneously with measurement of elapse in time. Every generation of the measurement data 6B, the remaining time t is calculated on the basis of the elapsed time and the required time. The calculated remaining time t together with the measurement data 6B is transmitted to the measurement-occasion processor 109.

When the elapsed time exceeds the required time, the measurement device 10r completes the processing of measurement. The measurement device 10r notifies the measurement-occasion processor 109 that the processing of measurement has been completed, simultaneously with transmission of the last generated measurement data 6B. The measurement-occasion processor 109 discriminates that the processing of measurement has been completed, on the basis of reception of the last generated measurement data 6B and reception of the notification that the processing of measurement has been completed.

According to the present embodiment, when the print image 7F on the view screen 5F is changed as described above (namely, changed to the image of the next original or the image of the previous original) or is adjusted, the job executor 104 may cause suspension of the job being performed, in accordance with an instruction from the user.

In this case, the job executor 104 may discriminate whether the user who has provided the instruction for performance of the job is identical to the user who has provided the instruction for change of the print image 7F. Then, in a case where both of the users are identical, as described above, the job executor 104 is required at least to control each constituent of the image forming apparatus 1 such that the job is suspended. After that, the screen display unit 103 is required at least to cause the touch panel display 10e to display the view screen 5F including the print image 7F changed in accordance with the instruction of the user.

In addition, for example, the entire configuration of the image forming apparatus 1, the configuration of each constituent of the image forming apparatus 1, the content of processing, the order of processing, and the configuration of data can be appropriately changed without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus to be used together with equipment to be used by a user with both hands, the image forming apparatus comprising:
a voice input unit configured to collect sound and generate voice data;
a hardware processor configured to turn on and off voice input processing;
wherein the image forming apparatus does not accept, by voice, an instruction for processing to be performed by the image forming apparatus before the user holds the equipment and the image processing apparatus turns on the voice input processing in response to the equipment being used with both of the hands.

2. The image forming apparatus according to claim 1, wherein the hardware processor is further configured to:
receive, from the equipment, information regarding a living body of the user acquired by the equipment while the equipment is being used with both of the hands; and
output the information received.

3. The image forming apparatus according to claim 1, wherein, while the image forming apparatus is performing a job given from the user as the processing, with the equipment used with both of the hands, the hardware processor accepts, by the voice, a first instruction for interruption or suspension of the job as the instruction.

4. The image forming apparatus according to claim 3, wherein the job includes a print job in which the image forming apparatus prints an image, and
while the image forming apparatus is performing the print job as the processing, with the equipment used with both of the hands, the hardware processor accepts, by the voice, a second instruction for suspension of the print job as the instruction while the image is being displayed, and then accepts, by the voice, a third instruction for rotation of the image as the instruction.

5. The image forming apparatus according to claim 4, wherein, while the equipment is being used with both of the hands, the hardware processor accepts, by the voice, as the instruction, a fourth instruction for start of a reprint job of printing the image printed or interrupted in printing by the image forming apparatus in the print job, as the processing newly.

6. The image forming apparatus according to claim 5, wherein, while the equipment is being used with both of the hands and while the image printed by the image forming apparatus in the print job is being displayed, the hardware processor accepts, by the voice, a fifth instruction for display of a different image printed by the image forming apparatus instead of the image or adjustment and display of the image as the instruction.

7. The image forming apparatus according to claim 6, wherein, after completion of preparation for performance of the processing while the equipment is being used with both of the hands, the hardware processor accepts, by the voice, a sixth instruction for start of the processing as the instruction.

8. The image forming apparatus according to claim 1, wherein the hardware processor is further configured to:
discriminate whether an operation method of the image forming apparatus by the voice is to be displayed, based on usage history indicating usage of the equipment by the user; and
the image forming apparatus further comprises a display that displays the operation method in a case where it is discriminated that the operation method is to be displayed.

9. The image forming apparatus according to claim 1, wherein the hardware processor disables the instruction from being accepted by the voice before the use of the equipment with both of the hands starts, enables the instruction to be accepted by the voice when the use of the equipment with both of the hands starts, and disables the instruction from being accepted by the voice when the use of the equipment with both of the hands finishes.

10. An image forming apparatus to be used together with equipment that measures a living body of a user holding the equipment with both hands, the image forming apparatus comprising:
a voice input unit configured to collect sound and generate voice data;
a hardware processor configured to turn on and off voice input processing;
wherein the image forming apparatus does not accept, by voice, an instruction for processing to be performed by the image forming apparatus before the user holds the equipment the image forming apparatus accepts, by the voice, the instruction while the equipment is measuring the living body.

11. An instruction acceptance method comprising:
disabling, before a user holds equipment to be used by the user with both hands, an image forming apparatus from accepting, by voice, an instruction for processing to be performed by the image forming apparatus; and
enabling the image forming apparatus to accept, by voice input processing, the instruction in response to the equipment being used with both of the hands.

12. A non-transitory recording medium storing a computer readable program for controlling an image forming apparatus to be used together with equipment to be used by a user with both of hands, the computer readable program causing the image forming apparatus to perform:
disabling an instruction for processing to be performed by the image forming apparatus, from being accepted by voice before the user holds the equipment; and
enabling the instruction to be accepted by voice input processing in response to the equipment being used with both of the hands.

* * * * *